United States Patent
Ito et al.

(10) Patent No.: US 11,127,974 B2
(45) Date of Patent: Sep. 21, 2021

(54) METHOD OF PREPARING SULFIDE-BASED SOLID ELECTROLYTE, SULFIDE-BASED SOLID ELECTROLYTE PREPARED THEREFROM, AND SOLID SECONDARY BATTERY INCLUDING THE SULFIDE ELECTROLYTE

(71) Applicant: SAMSUNG ELECTRONICS CO., LTD., Suwon-si (KR)

(72) Inventors: Seitaro Ito, Kanagawa (JP); Tomoyuki Tsujimura, Kanagawa (JP); Yuichi Aihara, Kanagawa (JP); Nobuya Machida, Kobe (JP)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 197 days.

(21) Appl. No.: 16/394,015

(22) Filed: Apr. 25, 2019

(65) Prior Publication Data

US 2019/0348707 A1    Nov. 14, 2019

(30) Foreign Application Priority Data

May 14, 2018  (JP) .............................. JP2018-093113
Oct. 30, 2018  (KR) ........................ 10-2018-0131111

(51) Int. Cl.
   *H01M 10/0562* (2010.01)
   *H01M 10/0525* (2010.01)
   *H01M 10/058* (2010.01)

(52) U.S. Cl.
   CPC ..... *H01M 10/0562* (2013.01); *H01M 10/058* (2013.01); *H01M 10/0525* (2013.01); *H01M 2300/0068* (2013.01); *Y02E 60/10* (2013.01)

(58) Field of Classification Search
   CPC .......... H01G 9/0003; H01G 2/16; H01G 2/04; H01G 9/008; H01G 11/78; H01G 9/08;
   (Continued)

(56) References Cited

U.S. PATENT DOCUMENTS

| 8,697,292 B2 | 4/2014 | Ryoji et al. |
| 2007/0160911 A1 | 7/2007 | Minoru et al. |

(Continued)

FOREIGN PATENT DOCUMENTS

| JP | 2011096630 A | 5/2011 |
| JP | 2012104279 A | 5/2012 |

(Continued)

OTHER PUBLICATIONS

English Language machine translation of "Sulfide Solid Electrolyte, and Method of Producing Sulfide Solid Electrolyte" by Ito Seitaro et al. in JP2015232965(A)—Dec. 24, 2015 (Year: 2015).*

(Continued)

*Primary Examiner* — Jonathan G Jelsma
*Assistant Examiner* — Omar M Kekia
(74) *Attorney, Agent, or Firm* — Cantor Colburn LLP

(57) ABSTRACT

A method of preparing a sulfide solid electrolyte, the method including: first contacting a starting materials including $Li_2S$, $P_2S_5$, and LiI in a first solvent to provide a precursor; and second contacting the precursor with a second solvent to prepare the sulfide solid electrolyte, wherein the first solvent includes a $C_1$-$C_3$ alkyl group or a cyclic ether compound which is unsubstituted or substituted with a $C_1$-$C_3$ alkoxy group, and the second solvent includes a $C_1$-$C_{10}$ hydrocarbon substituted with a $C_1$ to $C_6$ alkoxy group.

19 Claims, 3 Drawing Sheets

(58) Field of Classification Search
CPC ........... H01G 11/10; H01G 9/26; H01M 2/10; H01M 10/425; H01M 2/20; H01M 2/1016; H01M 2/34; H01M 2/30; H01M 2200/103; H01M 2300/0068; H01M 10/058; H01M 10/0525; H01M 10/0562; H01M 10/052; Y02E 60/10

USPC ........................................................ 429/322

See application file for complete search history.

(56) References Cited

U.S. PATENT DOCUMENTS

| | | |
|---|---|---|
| 2010/0290969 A1 | 11/2010 | Deiseroth et al. |
| 2011/0081580 A1 | 4/2011 | Florian et al. |
| 2013/0164632 A1 | 6/2013 | Yuki et al. |
| 2014/0141341 A1 | 5/2014 | Takamasa et al. |
| 2014/0302382 A1 | 10/2014 | Takayoshi et al. |
| 2014/0363745 A1 | 12/2014 | Masaaki et al. |
| 2015/0037687 A1 | 2/2015 | Ryoji et al. |
| 2015/0214572 A1 | 7/2015 | Yuki et al. |
| 2016/0133989 A1* | 5/2016 | Suzuki ................... C03C 3/323 429/323 |
| 2016/0149259 A1 | 5/2016 | Naoki et al. |
| 2016/0156064 A1 | 6/2016 | Norihiko et al. |
| 2016/0240886 A1 | 8/2016 | Hisatsugu et al. |
| 2017/0008808 A1 | 1/2017 | Takuo |
| 2017/0162901 A1 | 6/2017 | Zhebo et al. |
| 2017/0187066 A1 | 6/2017 | Tomoyuki et al. |
| 2017/0222257 A1 | 8/2017 | Norihiko et al. |

FOREIGN PATENT DOCUMENTS

| | | | |
|---|---|---|---|
| JP | 2013016423 A | 1/2013 | |
| JP | 2013201110 A | 10/2013 | |
| JP | 2014029796 A | 2/2014 | |
| JP | 2015072783 A | 4/2015 | |
| JP | 2015088226 A | 5/2015 | |
| JP | 2015232965 | * 12/2015 | ............. Y02E 60/10 |
| JP | 2016024874 A | 2/2016 | |
| JP | 5957144 B2 | 7/2016 | |
| JP | 6003831 B2 | 10/2016 | |
| JP | 2017018872 A | 1/2017 | |
| JP | 2017045613 A | 3/2017 | |
| JP | 2017117753 A | 6/2017 | |
| WO | 2005078740 A1 | 8/2005 | |
| WO | 2009047254 A1 | 4/2009 | |
| WO | 2012011179 A1 | 1/2012 | |
| WO | 2013069243 A1 | 5/2013 | |
| WO | 2013094757 A1 | 6/2013 | |
| WO | 2013118723 A1 | 8/2013 | |
| WO | 2014041823 A1 | 3/2014 | |
| WO | 2016009768 A1 | 1/2016 | |

OTHER PUBLICATIONS

Satoshi Ujiie et al., "Conductivity of 70Li2S■30P2S5 glasses and glass-ceramics added with lithium halides," Solid State Ionics, Oct. 1, 2014, pp. 57-61, vol. 263.

Sylvain Boulineau et al., "Mechanochemical synthesis of Li-argyrodite Li6PS5X (X=Cl, Br, I) as sulfur-based solid electrolytes for all solid state batteries application," Solid State Ionics, Jun. 23, 2012, pp. 1-5, vol. 221.

* cited by examiner

METHOD OF PREPARING SULFIDE-BASED SOLID ELECTROLYTE, SULFIDE-BASED SOLID ELECTROLYTE PREPARED THEREFROM, AND SOLID SECONDARY BATTERY INCLUDING THE SULFIDE ELECTROLYTE

CROSS-REFERENCE TO RELATED APPLICATIONS

This application claims priority to and the benefit of Japanese Patent Application No. 2018-093113, filed on May 14, 2018, in the Japan Patent Office, and Korean Patent Application No. 10-2018-0131111, filed on Oct. 30, 2018, in the Korean Intellectual Property Office, and all the benefits accruing therefrom under 35 U.S.C. § 119, the contents of which are incorporated herein in their entireties by reference.

BACKGROUND

1. Field

The present disclosure relates to a method of preparing a sulfide-based solid electrolyte by using an organic solvent, a sulfide-based solid electrolyte prepared therefrom, and a solid secondary battery including the sulfide-based solid electrolyte.

2. Description of the Related Art

Due to their high energy density, lithium-ion batteries have been used in electric automobiles, personal digital assistants, and the like. To improve the performance of such solid secondary batteries, solid electrolytes having high ion conductivity and high safety have been studied.

In a lithium-ion secondary battery using an electrolyte, an intermediate of an active material generated during a charging and discharging process is dissolved in an electrolyte, resulting in deterioration of performance, such as a loss of capacity and poor cycle characteristics, and stability issues. Also, a lithium-ion secondary battery using a solid electrolyte (hereinafter referred to as a solid secondary battery) has high stability compared to a lithium-ion secondary battery using a non-solid electrolyte. In addition, a solid secondary battery is able to be prepared to be lightweight and small, and at the same time, is able to have an extended lifespan depending on features constituting the solid secondary battery.

In this regard, a sulfide-based solid electrolyte having excellent ion conductivity has drawn attention as a solid electrolyte for a solid secondary battery. Such a sulfide-based solid electrolyte may be prepared by a solid-phase synthesis method using, for example, a mechanical milling process or the like.

However, a solid-phase synthesis method using a mechanical milling process has a problem in that not only is input energy during synthesis relatively large, but the synthesis time is also relatively long. In this regard, it is difficult to increase the scale of the process, and is also difficult to lower the cost of synthesis.

SUMMARY

A sulfide-based solid electrolyte may have relatively high ion conductivity, but the ion conductivity may be easily influenced by temperature. When the ion conductivity is highly dependent on temperature, the ion conductivity may be relatively low in a low-temperature region. Use of a sulfide-based solid electrolyte having a relatively low activation energy may lower the temperature-dependency of the ion conductivity.

Therefore, provided are a sulfide-based solid electrolyte having a relatively low activation energy and improved ion conductivity, a method of efficiently preparing the sulfide-based solid electrolyte, and a solid secondary battery using the sulfide-based solid electrolyte.

Additional aspects will be set forth in part in the description which follows and, in part, will be apparent from the description, or may be learned by practice of the presented embodiments.

According to an embodiment, provided is a method of preparing a sulfide solid electrolyte, the method including: first contacting a starting material including $Li_2S$, $P_2S_5$, and LiI in a first solvent to provide a precursor; and second contacting the precursor with a second solvent to prepare the sulfide solid electrolyte, wherein the first solvent includes a $C_1$-$C_3$ alkyl group or a cyclic ether compound which is unsubstituted or substituted with a $C_1$-$C_3$ alkoxy group, and the second solvent includes a $C_1$-$C_{10}$ hydrocarbon substituted with a $C_1$ to $C_6$ alkoxy group.

According to an embodiment, provided is a sulfide solid electrolyte prepared according to the method.

According to an embodiment, provided is a solid secondary battery including: a positive electrode including a positive active material; a negative electrode including a negative active material, and a solid electrolyte layer disposed between the positive electrode and the negative electrode, wherein the solid electrolyte layer includes a sulfide solid electrolyte prepared according to the method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
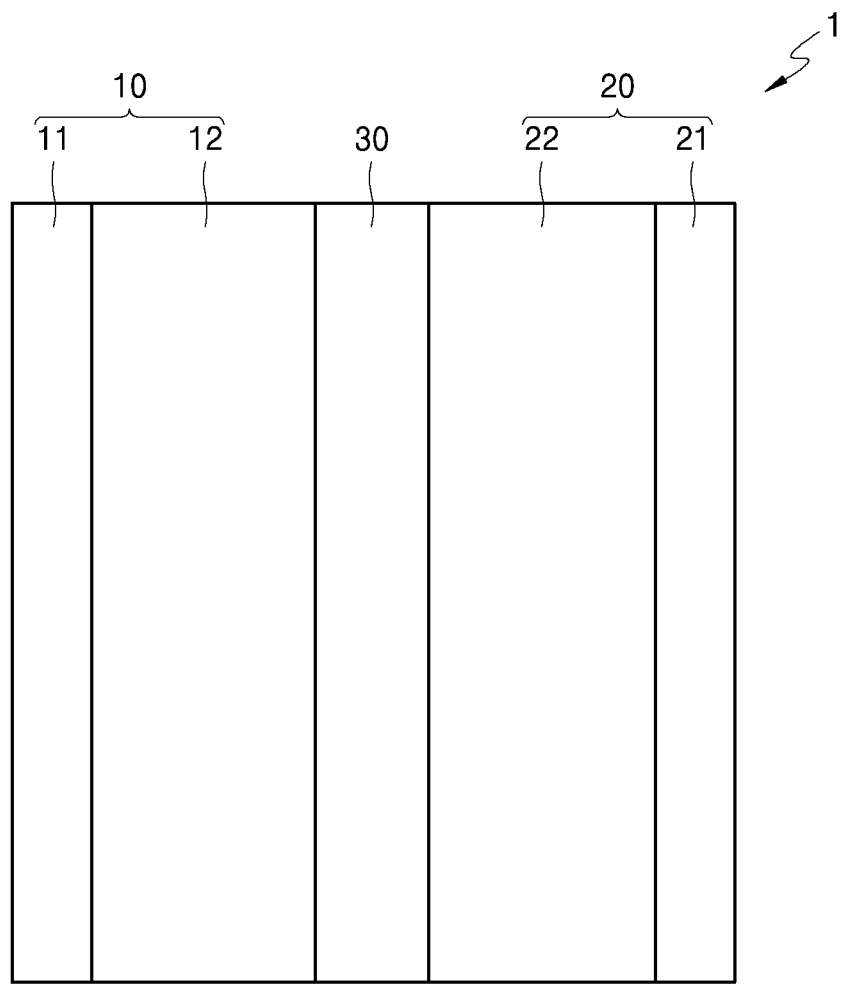
FIG. 1 is a schematic diagram showing a layered structure of a solid secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkoxy" means an alkyl group that is linked via an oxygen (i.e., alkyl-O—), for example methoxy, ethoxy, and sec-butyloxy groups.

"Alkyl" means a straight or branched chain, saturated, monovalent hydrocarbon group (e.g., methyl or hexyl).

"Hydrocarbon" means an organic compound having at least one carbon atom and at least one hydrogen atom, wherein one or more of the hydrogen atoms can optionally be substituted by a halogen atom (e.g., $CH_3F$, $CHF_3$ and $CF_4$ are each a hydrocarbon as used herein).

The number of carbon atoms indicated in a group is exclusive of any substituents.

A solution process for preparing a sulfide-based solid electrolyte may include mixing a starting material, for example, $Li_2S$ and $P_2S_5$, in an organic solvent. In a solution process, a relatively small amount of energy may be used during synthesis and a reaction time may be relatively short, and it may be possible to both increase the scale of the process and lower the cost thereof. Provided is a solution process for preparing a sulfide-based solid electrolyte having improved characteristics.

Method of Preparing Sulfide-Based Solid Electrolyte

A method of preparing a sulfide-based solid electrolyte according to an embodiment of the present disclosure will be described.

A method of preparing a sulfide-based solid electrolyte according to an embodiment may include: obtaining a precursor by mixing starting materials including at least $Li_2S$, $P_2S_5$, and LiI in a first solvent (first process); and obtaining a sulfide-based solid electrolyte by a reaction of the precursor in a second solvent (second process).

Here, the first solvent may include a $C_1$-$C_3$ alkyl group or a cyclic ether compound unsubstituted or substituted with a $C_1$-$C_3$ alkoxy group, and the second solvent may include a hydrocarbon substituted with an alkoxy group.

While not wanting to be bound by theory, it is understood that in the processes above, a reaction path resulting in the production of the sulfide-based solid electrolyte includes the first process, in which $Li_2S$ and $P_2S_5$ are reacted in the first solvent to produce a solvate such as $Li_3PS_4$ (for example, $Li_3PS_4$·3tetrahydrofuran (THF) solvate), and then, reaction of the solvate with a halogen substance in the second process, and crystals of the sulfide-based solid electrolyte are produced. However, a reaction path is not limited thereto.

First Process

In the first process, a precursor is obtained by mixing and treating starting materials of the sulfide-based solid electrolyte in the first solvent.

The starting materials of the sulfide-based solid electrolyte may include at least $Li_2S$, $P_2S_5$, and LiI. In addition, the starting materials may further include LiBr and/or LiCl. When these starting materials are used for synthesis of the sulfide-based solid electrolyte, a sulfide-based solid electrolyte thus obtained may have a relatively low activation energy and relatively high ion conductivity.

In an embodiment, a ratio of $Li_2S$, $P_2S_5$, and LiI is not particularly limited, and may vary depending on a composition of a sulfide-based solid electrolyte to be prepared. For example, regarding the first process, by a reaction between $Li_2S$ and $P_2S_5$, a compound, such as $Li_3PS_4$, $Li_4P_2S_6$, $Li_4P_2S_7$, or $Li_7P_3S_{11}$, may be produced. Thus, to obtain a desired compound, a ratio of $Li_2S$ and $P_2S_5$ may be appropriately changed. For example, a ratio of $Li_2S$ and $P_2S_5$ may be set to produce $Li_3PS_4$. Here, a molar ratio of substances included in the starting materials may be the same as that of substances included in a sulfide material obtained therefrom. Thus, when a sulfide-based solid electrolyte is prepared with a desired composition ratio, a mixing ratio of the starting materials may be adjusted so that a molar ratio of the substances included in the starting materials is the same as a composition ratio of the substances included in the sulfide material.

In an embodiment, a ratio of LiX to $Li_2S$ and $P_2S_5$ (where X is Br or Cl) may be in a range of about 5 mol % to about 60 mol %, and for example, may be in a range of about 10 mol % to about 50 mol %. In this regard, a substance having substantially the same characteristics as those of a solid electrolyte material obtainable by a solid phase method may be obtained by using a solution process.

In particular, a sulfide-based solid electrolyte represented by Formula (1) may be obtained:

$$(1-x)\text{LiI} \cdot x\text{LiBr} \cdot 2\text{Li}_3\text{PS}_4 \qquad \text{Formula (1),}$$

wherein, in Formula (1), x is from 0 to 1.0.

In an embodiment, in the first organic solvent, $GeS_2$, $P_2S_3$, $P_2O_5$, $SiO_2$, $B_2S_3$, $Al_2S_3$, $B_2O_3$, or a combination thereof may be further added as the starting material. Accordingly, the sulfide-based solid electrolyte may have further improved ion conductivity. When the starting material includes any of the foregoing, the sulfide-based solid electrolyte may include, for example, $Li_2S$—$SiS_2$, $Li_2S$—$GeS_2$, $Li_2S$—$P_2S_5$—$SiS_2$, or $Li_2S$—$P_2S_5$—$GeS_2$.

In addition, the first solvent may include, as described above, a $C_1$-$C_3$ alkyl group or a cyclic ether compound that is unsubstituted or substituted with a $C_1$-$C_3$ alkoxy group. When the first solvent, such as the foregoing, is used, the reaction between $Li_2S$ and $P_2S_5$ may proceed relatively smoothly while decomposition of starting materials is prevented.

A cyclic ether skeleton constituting such a cyclic ether compound may be, although not particularly limited, $C_4$-$C_{10}$ cyclic ether, and for example, may be $C_4$-$C_6$ cyclic ether. An example of the cyclic ether skeleton includes an oxetane skeleton, a tetrahydrofuran skeleton, or a tetrahydropyran skeleton.

In addition, a substituent that may be substituted to the cyclic ether skeleton may be, as described above, a $C_1$-$C_3$ alkyl group or a $C_1$-$C_3$ alkoxy group. Examples of the substituent include a methyl group, an ethyl group, an n-propyl group, an iso-propyl group, a methoxy group, an ethoxy group, an n-propoxy group, and an iso-propoxy group.

Examples of the cyclic ether compound include tetrahydrofuran, oxetane, and tetrahydropyran.

In addition, a concentration of the starting material in a mixture including the first solvent and the starting material may be in a range of about 1 mass percent (mass %) to about 10 mass %, and for example, may be in a range of about 2 mass % to about 8 mass %.

In addition, the reaction time (mixing time) for the raw materials and the first solvent in the first process is not particularly limited, but may be in a range of about 0.5 hour to about 48 hours, and for example, may be in a range of about 1 hour to about 24 hours. In this regard, the reaction of the raw materials in the first process may proceed.

In addition, the temperature for the mixing of the materials and first solvent in the first process is not particularly limited, but may be in a range of about 30° C. to about 80° C., and for example, may be in a range of about 35° C. to about 60° C. In this regard, the reaction of materials in the first process may proceed.

In addition, the atmosphere of the first process may be under an inert gas such as argon or nitrogen.

In addition, to achieve a uniform reaction at the time of the mixing of raw materials in the first process, stirring or the like may be carried out.

According to the above-described embodiment, a reaction solution containing a precursor of the sulfide-based solid electrolyte may be obtained. In an embodiment, the first solvent in the obtained reaction solution may be removed by an appropriate method. For example, the first solvent may be removed by filtration or vacuum removal by a rotary evaporator or a vacuum dryer.

Second Process

In the second process, through a reaction between the precursor obtained in the first process and a second solvent, a sulfide-based solid electrolyte may be obtained.

Here, the second solvent may include a hydrocarbon substituted with an alkoxy group. In an embodiment, a sulfide-based solid electrolyte may be produced by an additional reaction of the precursor produced in the first process in the second solvent.

A hydrocarbon skeleton constituting the hydrocarbon substituted with the alkoxy group may include a non-cyclic $C_1$-$C_{10}$ (for example, $C_2$-$C_8$) hydrocarbon or a cyclic $C_3$-$C_{10}$ (for example, $C_3$-$C_8$) hydrocarbon.

A chain hydrocarbon may be a linear type or a branched type, and examples thereof include methane, ethane, propane, 2-methyl propane, 2,2-dimethyl propane, butane, 2-methyl butane, 2,2-dimethyl butane, 2,3-dimethyl butane, pentane, 2-methyl pentane, 2,2-dimethyl pentane, 2,3-dimethyl pentane, 2,4-dimethyl pentane, 3-ethyl pentane, hexane, heptane, octane, nonane, decane, or the like.

The cyclic hydrocarbon may include cyclopropane, cyclobutane, cyclopentane, cyclohexane, cycloheptane, cyclooctane, cyclononane, cyclodecane, or any of the foregoing compounds substituted with an alkyl group, such as a methyl group or an ethyl group. In addition, the number of substitution in the compound substituted with an alkyl group is not particularly limited, but the compound may be substituted with one or two alkyl groups.

The alkoxy group constituting the hydrocarbon substituted with the alkoxy group may include, for example, a linear or branched alkoxy group having at least one carbon atom. Examples of the alkoxy group include a methoxy group, an ethoxy group, an n-propoxy group, an iso-propoxy group, an n-butoxy group, a sec-butoxy group, an iso-butoxy group, a tert-butoxy group, or the like. For example, the alkoxy group may include a methoxy group, an ethoxy group, or an iso-propoxy group. In addition, the number of the alkoxy group in the hydrocarbon substituted with the alkoxy group may be 1 to 8, and for example, may be 1 to 6.

For example, the hydrocarbon substituted with the alkoxy group may include: dimethyl ether, methyl ethyl ether, diethyl ether, methyl n-propyl ether, ethyl n-propyl ether, di-n-propyl ether, methyl iso-propyl ether, ethyl iso-propyl ether, di-iso-propyl ether, n-propyl iso-propyl ether, methyl n-butyl ether, ethyl n-butyl ether, n-propyl n-butyl ether, iso-propyl n-butyl ether, methyl sec-butyl ether, ethyl sec-butyl ether, n-propyl sec-butyl ether, iso-propyl sec-butyl ether, methyl iso-butyl ether, ethyl iso-butyl ether, n-propyl iso-butyl ether, iso-propyl iso-butyl ether, methyl tert-butyl ether, ethyl tert-butyl ether, n-propyl tert-butyl ether, iso-propyl tert-butyl ether, di-n-butyl ether, di-sec-butyl ether, di-iso-butyl ether, sec-butyl n-butyl ether, iso-butyl n-butyl ether, tert-butyl n-butyl ether, iso-butyl sec-butyl ether, tert-butyl sec-butyl ether, tert-butyl iso-butyl ether, or a combination thereof;

dimethoxy ethane, diethoxy ethane, methoxy ethoxy ethane, 1,3-dimethoxy propane, 1,3-diethoxy propane, 1-methoxy 3-ethoxy propane, 1,2-dimethoxy propane, 1,2-diethoxy propane, 1-methoxy 2-ethoxy propane, 1-ethoxy 2-methoxy propane, or a combination thereof;

cyclopropyl methyl ether, cyclopropyl ethyl ether, cyclobutyl methyl ether, cyclobutyl ethyl ether, cyclobutyl n-propyl ether, cyclobutyl iso-propyl ether, cyclopentyl methyl ether, cyclopentyl ethyl ether, cyclopentyl n-propyl ether, cyclopentyl iso-propyl ether, cyclopentyl n-butyl ether, cyclopentyl iso-butyl ether, cyclopentyl sec-butyl ether, cyclopentyl tert-butyl ether, cyclohexyl methyl ether, cyclohexyl ethyl ether, cyclohexyl n-propyl ether, cyclohexyl iso-propyl ether, cyclohexyl n-butyl ether, cyclohexyl iso-butyl ether, cyclohexyl sec-butyl ether, cyclohexyl tert-butyl ether, or a combination thereof; or a combination thereof.

In an embodiment, the second solvent may include dimethoxy ethane, diethoxy ethane, diethyl ether, di-iso-propyl ether, cyclopentylmethyl ether, or a combination thereof.

In addition, a concentration (substrate concentration) of the precursor in a mixture including the second solvent and the precursor may be in a range of about 1 mass % to about 10 mass %, and for example, may be in a range of about 2 mass % to about 8 mass %.

The second process may be carried out by, for example, allowing the mixed solution containing the precursor and the second solvent to react for a predetermined time, and then, removing the second solvent from the reaction solution. The reaction time (mixing time) for the precursor and the second solvent in the second process is not particularly limited, but may be in a range of about 0.5 hour to about 48 hours, and for example, may be in a range of about 1 hour to about 24 hours. In this regard, the reaction of the raw materials in the second process may proceed.

In addition, the temperature for the mixing of the precursor and the second solvent in the second process is not particularly limited, but may be in a range of about 80° C. to about 200° C., and for example, may be in a range of about 100° C. to about 180° C. In this regard, the reaction of the precursor in the second process may proceed.

In addition, the atmosphere at the time of mixing of the precursor and the second solvent may be an inert gas atmosphere, such as an argon atmosphere or a nitrogen atmosphere, to suppress the oxidation of the solid electrolyte material.

In addition, in the second process, to achieve a uniform reaction at the time of the mixing the mixture in the second process, stirring or the like may be carried out.

In addition, in the second process, the mixed solution containing the precursor and the second solvent may be heated. Accordingly, the reaction of the precursor may be further promoted, and at the same time, the crystal structure of the resulting sulfide-based solid electrolyte of the reaction may be controlled.

Here, the heating temperature is not particularly limited, but may be in a range of about 100° C. to about 200° C., and for example, may be in a range of about 100° C. to about 180° C. In addition, the heating time is not particularly limited, but may be in a range of about 30 minutes to about 300 minutes, and for example, may be in a range of about 60 minutes to about 300 minutes.

In addition, the heating of the mixture in the second process may be carried out under a reduced pressure atmosphere. Accordingly, the second solvent may be removed along with the heating of the precursor. The pressure at the time of the depressurization may be in a range of about 0.01 megapascals (MPa) to about 2 MPa, and for example, may be in a range of about 0.1 MPa to about 1 MPa.

Optionally, the heating in the second process may be carried out after most of the second solvent is removed from the mixture. Accordingly, abrupt boiling of the second solvent may be prevented, and at the same time, the pressure in the reaction system may be further easily controlled. The separation of the second solvent may be carried out by, for example, filtration or the like.

By performing the first process and the second process, a sulfide-based solid electrolyte may be obtained. Furthermore, the sulfide-based solid electrolyte thus obtained may be additionally washed and/or dried.

According to an embodiment of the method of preparing the sulfide-based solid electrolyte, a sulfide-based solid electrolyte, which includes a halogen component by using a solution method, may be efficiently prepared. A sulfide-based solid electrolyte obtainable according to the preparation method of the present disclosure may have excellent ion conductivity, and at the same time, have relatively low activation energy.

In addition, according to the preparation method of the present disclosure, for example, a sulfide-based solid electrolyte powder having a particle diameter of 1 micrometer (μm) or less may be obtained. In this regard, a pulverization process or a grinding process, each of which processes may be used in a solid-phase synthesis method, may be omitted. Therefore, from the viewpoint of not only energy for synthesis of a sulfide-based solid electrolyte, but also easiness of treatment after synthesis, the preparation method of the present disclosure is more advantageous than the solid-phase synthesis method.

Characteristics of the Sulfide-Based Solid Electrolyte

The sulfide-based solid electrolyte prepared according to the method of the present disclosure may have a characteristic crystalline form. In detail, the sulfide-based solid electrolyte prepared according to the method of the present disclosure exhibits peaks at angles (2θ) of 19.9±0.5°, 23.5±0.5°, and 29.3±0.5° in an X-ray diffraction spectrum when measured using a Cu—Kα line. Here, when a peak at a position of 2θ=19.9±0.5° is referred to as IA, and a peak at a position of 2θ=17.0±0.5° is referred to as IB, a ratio of IB/IA may be less than 0.50. Considering a peak position and a relative peak intensity, it is confirmed that the sulfide-based solid electrolyte of the present disclosure has a characteristic crystalline form.

In addition, the sulfide-based solid electrolyte obtained according to the preparation method of the present disclosure may have, for example, ion conductivity of $1.0 \times 10^{-5}$ siemens per centimeter (S/cm) or greater or $5.0 \times 10^{-4}$ S/cm or greater, at a temperature of 25° C., for example, about $1.0 \times 10^{-5}$ siemens per centimeter to about $1.0 \times 10^{-2}$ siemens per centimeter at a temperature of 25° C.

In an embodiment, the sulfide-based solid electrolyte obtained according to the preparation method of the present disclosure may have activation energy of 40 kilojoules per mole (kJ/mol) or less, or 35 kJ/mol or less. In an embodiment, the sulfide-based solid electrolyte obtained according to the preparation method of the present disclosure may have activation energy in a range of about 30 kJ/mol to about 40 kJ/mol. The activation energy within the range above may lower the temperature dependency of the ion conductivity, and thus, a decrease in the ion conductivity particularly in low-temperature regions may be prevented.

In an embodiment, the measurement of the ion conductivity of the sulfide-based solid electrolyte and the calculation of the activation energy of the sulfide-based solid electrolyte may be carried out by the following method. A sulfide-based solid electrolyte ground in an agate mortar was compressed (at a pressure of 400 megapascals per square centimeter ($MPa/cm^2$)) to produce a pellet. Indium foil (having a thickness of 50 μm) is attached on both side of the pellet, and then, an alternating current impedance of the pellet is measured, so as to measure ion conductivity of the pellets. In addition, based on the measured ion conductivity, the activation energy may be calculated according to the Arrhenius equation:

$$\sigma = (\sigma_0/T)\exp(-Ea/kT)$$

wherein σ is ion conductivity, $\sigma_0$ is a pre-exponential factor, T is a temperature, Ea is activation energy for the ion conductivity, and k is the Bolzmann constant.

Solid Secondary Battery

Hereinafter, a solid secondary battery according to an embodiment will be described in detail. FIG. 1 is a schematic diagram showing a layered-structure of a solid secondary battery according to an embodiment. As shown in FIG. 1, a solid secondary battery 1 includes a positive electrode layer 10, a negative electrode layer 20, and a solid electrolyte layer 30 disposed between the positive electrode layer 10 and the negative electrode layer 20. In addition, in the solid secondary battery 1, the sulfide-based solid electrolyte described above may be used in at least one layer selected from the positive electrode layer 10, the negative electrode layer 20, and the solid electrolyte layer 30, for example, in the positive electrode layer 10 and the solid electrolyte layer 30.

Positive Electrode Layer

The positive electrode layer 10 may include a positive current collector 11 and a positive active material layer 12.

The positive current collector 11 may include a plate or a foil, each including, e.g., consisting of, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. Optionally, the positive current collector 11 may be omitted. In addition, the positive current collector 11 may be connected to an interconnect through a terminal.

The positive active material layer 12 may include a positive active material and a solid electrolyte. In addition, a solid electrolyte included in the positive active material layer 12 may be identical to or different from a solid electrolyte included in the solid electrolyte layer 30. A solid electrolyte will be described in detail in a description section of the solid electrolyte layer 30.

A positive active material may be capable of reversibly intercalating and deintercalating lithium ions. The positive active material may be formed by using, for example, a lithium salt, such as lithium cobalt oxide ("LCO"), lithium nickel oxide, lithium nickel cobalt oxide, lithium nickel cobalt aluminum oxide ("NCA"), lithium nickel cobalt manganese oxide ("NCM"), lithium manganese oxide ("LMO"), and lithium iron phosphate ("LFP"), nickel sulfide, copper sulfide, sulfur, iron oxide, or vanadium oxide. One or more positive active material may be used.

The positive active material may be a lithium salt of a transition metal oxide having a layered rock salt structure. The term "layered structure" as used herein refers to a structure with a thin sheet shape. The term "rock salt structure" as used herein refers to a sodium chloride type structure which is one type of a crystal structure, wherein face-centered cubic lattices, each formed by a cation and an anion, have a structure deviated by ½ of the corners of unit lattices. The lithium salt of the transition metal having such a layered structure may include, for example, a lithium salt of a ternary transition metal oxide, such as $LiNi_xCo_yAl_zO_2$ ("NCA") or $LiNi_xCo_yMn_zO_2$ ("NCM") (where 0<x<1, 0<y<1, 0<z<1, wherein, x+y+z=1). When the positive active material includes a lithium salt of the ternary transition metal oxide having the above-described layered rock salt structure, the energy density and thermal stability of the solid secondary battery 1 may improve.

The positive active material may be covered by a coating layer. The coating layer may be a suitable coating layer used for the positive material in the solid secondary battery 1, and may include, for example, $Li_2O$—$ZrO_2$.

When the positive active material is formed of a lithium salt of a ternary transition metal including nickel, such as NCA or NCM, the capacity density of the solid secondary battery 1 may increase, thereby reducing metal elution from the charged positive active material. Accordingly, the solid secondary battery 1 may have improved long-term reliability and cycle characteristics in the charged state.

Here, a shape of the positive active material may include, for example, a particle shape, such as a spherical shape or an oval shape. In addition, a particle diameter of the positive active material is not particularly limited, but may be in a range applicable to positive active materials of solid secondary batteries. In addition, a content of the positive active material in the positive active material layer 12 is not particularly limited, but may be in a range applicable to positive electrode layers of solid secondary batteries.

In addition, the positive active material layer 12 may include, in addition to the above-described positive active material and the solid electrolyte, an additive, such as a conducting agent, a binder, a filler, a dispersing agent, or an ion conducting agent.

The conducting agent that may be mixed in the positive active material layer 12 may include, for example, graphite, carbon black, acetylene black, ketjen black, carbon fiber, metal powder, and the like. In addition, the binder that may be mixed in the positive active material layer 12 may include, for example, styrene butadiene rubber ("SBR"), polytetrafluoroethylene, polyvinylidene fluoride, polyethylene, and the like. In addition, the filler, the dispersing agent, or the ion conducting agent that may be mixed in the positive electrode layer 10 may each be suitable materials used for electrodes of solid secondary batteries.

Negative Electrode Layer

The negative electrode layer 20 may include a negative current collector 21 and a negative active material 22. The negative current collector 21 may include a plate or a foil, each including, e.g., consisting of, for example, In, Cu, Mg, stainless steel, Ti, Fe, Co, Ni, Zn, Al, Ge, Li or an alloy thereof. Optionally, the negative current collector 21 may be omitted. In addition, the negative current collector 21 may be connected to an interconnect through a terminal.

The negative active material 22 may include a lithium metal or a lithium-containing alloy. That is, the negative active material 22 may consist of a lithium metal only, or may be a lithium-containing alloy of a lithium metal and other metallic active materials (for example, In, Al, tin (Sn), silicon (Si), or the like). For example, when the negative active material 22 consists of a lithium metal only, that is, in the case of a metallic lithium layer, the energy density of the solid secondary battery 1 may improve.

Solid Electrolyte Layer

The solid electrolyte layer 30 may be disposed between the positive electrode layer 10 and the negative electrode layer 20, and may include a solid electrolyte.

The solid electrolyte may include the sulfide-based solid electrolyte prepared according to the preparation method of the present disclosure.

In addition, the solid electrolyte may further include a suitable sulfide-based solid electrolyte. A material for the sulfide-based solid electrolyte may include, for example, $Li_2S$—$P_2S_5$, $Li_2S$—$P_2S_5$—LiX (where X is a halogen atom, such as I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—B2S3-LiI, $Li_2S$—$SiS_2$—$P_2S_5$—LiI, $Li_2S$—$B_2S_3$, $Li_2S$—$P_2S_5$-ZnSn (where m and n are each an integer, and Z is Ge, Zn, or Ga), $Li_2S$—$GeS_2$, or $Li_2S$—$SiS_2$—$Li_3PO_4$, $Li_2S$—$SiS_2$-$Li_pMO_q$ (where p and q are each an integer, and M is P, Si, Ge, B, Al, Ga, or In).

In addition, the solid electrolyte layer 30 may further include a binder, and examples of the binder include SBR, polytetrafluoroethylene, polyvinylidene fluoride, polyethylene, and the like. The binder included in the solid electrolyte layer 30 may be identical to or different from the binder included in the positive active material layer 12.

Method of Preparing a Solid Secondary Battery

Next, a method of preparing the solid secondary battery 1 will be described in detail. The solid secondary battery 1 according to an embodiment may be prepared by producing a sulfide-based solid electrolyte according to the above-described method, and then producing the positive electrode layer 10, the negative electrode layer 20, the solid electrolyte layer 30, with materials constituting the foregoing, using the sulfide-based solid electrolyte when needed, and laminating these layers.

Preparation of a Sulfide-Based Solid Electrolyte

Regarding the method of preparing the solid secondary battery 1 according to an embodiment, a sulfide-based solid electrolyte may be prepared by the above-described method of preparing the sulfide-based solid electrolyte. Therefore, the method of preparing the solid secondary battery 1 may include the first process and the second process described above.

Preparation of a Solid Electrolyte Layer

The solid electrolyte layer 30 may be prepared by using the sulfide-based solid electrolyte prepared according to an embodiment.

In an embodiment, a solid electrolyte layer 30 may be prepared by performing aerosol deposition, cold spray, or sputtering using the sulfide-based solid electrolyte prepared according to an embodiment. In an embodiment, the solid electrolyte layer 30 may be prepared by compressing the powder of the sulfide-based solid electrolyte. In an embodiment, the solid electrolyte layer 30 may be prepared by mixing the sulfide-based solid electrolyte with a solvent and a binder, and then, by coating, drying, and compressing the mixture.

Preparation of the Positive Electrode Layer

The positive electrode layer 10 may be prepared by, for example, the following method. The positive active material, the sulfide-based solid electrolyte prepared by the above-described method, and various additives are mixed together, and then, a solvent, such as water or an organic solvent is added to the mixture, to form a slurry or a paste. Next, the formed slurry or paste may be coated on a current collector, dried, and then, rolled, so as to obtain the positive electrode layer 10. Alternatively, the positive electrode layer 10 may be prepared by mixing the sulfide-based solid electrolyte, the positive active material, and various additives together, and then, compressing and rolling the mixture.

Preparation of the Negative Electrode Layer

The negative electrode layer 20 may be prepared in the same manner as in the positive electrode layer 10. In detail, materials, such as negative active materials, that constitute the negative active material 22 may be mixed, and then, a solvent, such as water or an organic solvent may be added to the mixture, so as to form a slurry or a paste. Next, the prepared slurry or the paste may be coated on a current collector, dried, and then, rolled, so as to obtain the negative electrode layer 20. Alternatively, the negative active material of the negative electrode layer 20 may be sputtered on a negative current collector 31, so as to form the negative active material 22.

Preparation of the Solid Secondary Battery

The solid electrolyte layer 30, the positive electrode layer 10, and the negative electrode layer 20 prepared according to the above-described method may be stacked one another to form a solid secondary battery 1. In detail, the solid electrolyte layer 30, the positive electrode layer 10, and the negative electrode layer 20 may be disposed in a way that the solid electrolyte layer 30 is disposed between the positive electrode layer 10 and the negative electrode layer 20, and then, a pressure may be applied to the layered-structure, thereby preparing the solid secondary battery 1.

As described above, the sulfide-based solid electrolyte may be prepared by a solution method by dividing the preparation step of the sulfide-based solid electrolyte into two stages, and by using a particular solvent in each stage. In this regard, the sulfide-based solid electrolyte thus obtained may have a particular crystalline structure, and at the same time, may have relatively low activation energy and relatively high ion conductivity.

EXAMPLES

Hereinafter, a method of preparing a sulfide-based solid electrolyte according to an embodiment will be described in detail with reference to Examples and Comparative Examples below. In addition, the following Examples are provided for illustrative purposes only, and the present disclosure is not limited thereto.

Example 1

In a glove box with an Ar atmosphere, LiI (purity of 99.9%, Aldrich), $Li_2S$ (purity of 99.9%, Mitsuwa Chemicals), and $P_2S_5$ (purity of 99%, Aldrich) were used to form 1.5 grams (g) of powder having a composition of $Li_7P_2SaI$.

In the Ar atmosphere, 40 milliliters (ml) of tetrahydrofuran ("THF") as a first organic solvent and the prepared powder were mixed in a beaker having a volume of 50 ml, and then, the mixture was stirred at a temperature of 40° C. overnight to allow a reaction. After completion of the reaction, a rotary evaporator was used to remove the first organic solvent at a temperature of about 40° C., thereby obtaining a precursor (first process).

Next, under the conditions of the Ar atmosphere and the temperature of 150° C., the precursor was stirred in 100 ml diethyl ether ("DEE") as a second organic solvent for 2 hours. The remaining powder after the stirring was vacuum-dried at a temperature of 150° C. for 1 hour, thereby completely removing the remaining second organic solvent. After the vacuum-drying, the remaining powder was cooled to room temperature, and then, collected, thereby obtaining a sulfide-based solid electrolyte (second process).

The sulfide-based solid electrolyte thus obtained was then subjected to measurement of ion conductivity, calculation of activation energy, and powder X-ray diffraction examination.

In detail, the powders of the prepared sulfide-based solid electrolyte were placed in a mold having a diameter of 10 millimeters (mm), and a pressure of 350 millipascals (mPa) was applied thereto so that the powder were molded to pellets. Both sides of pellets were coated with an indium (In) thin film to prepare a sample for measurement of ion conductivity. Then, the sample was subjected to measurement of ion conductivity at a temperature of 25° C. by using AUTOLAB PGSTAT30 (Metrohm Autolab Company). Furthermore, based on the measurements of ion conductivity at a temperature range of about 17° C. to about 140° C., activation energy was also calculated according to the Arrhenius equation.

Accordingly, the measured ion conductivity was $6.9 \times 10^{-4}$ siemens per centimeter (S/cm) at a temperature of 25° C., and the calculated activation energy was 35.0 kilojoules per mole (kJ/mol).

Figure 2:
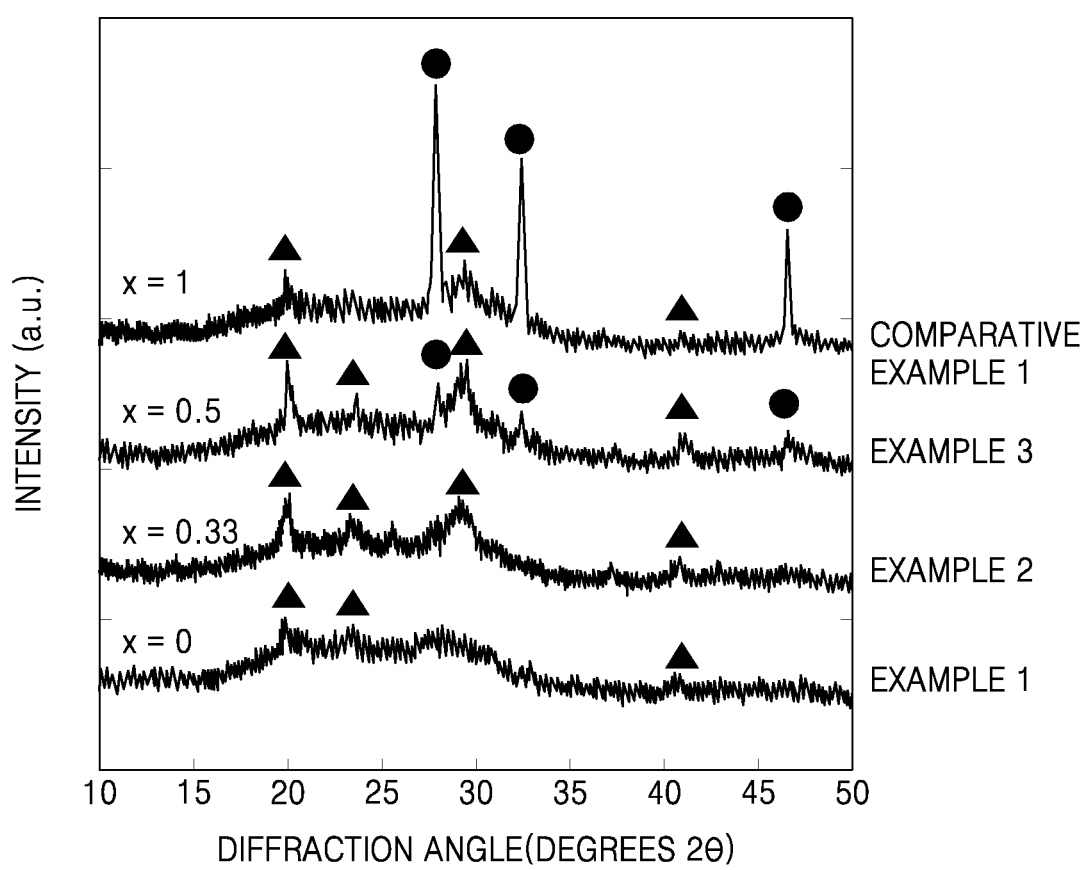
FIG. 2 is a graph of intensity (arbitrary units (a.u.)) versus diffraction angle (degrees 2θ) showing the results of powder X-ray diffraction analysis of sulfide-based solid electrolytes prepared in Examples 1 to 3 and Comparative Example 1 using Cu—Kα radiation.

A powder X-ray diffractometer, Emperean (Panalytical Company), was used to measure a powder X-ray diffraction spectrum on the powders of the sulfide-based solid electrolyte of Example 1, and the measured powder X-ray diffraction spectrum was shown in FIG. 2.

As shown in FIG. 2, peaks were clearly observed at a position of 2θ=19.9° and 2θ=23.5°. Although a peak observed at a position of 2θ=29.3° was not able to be clearly identified in FIG. 2, due to a weak signal intensity, as a result of separate analysis, it was confirmed that the peak was present in the same powder X-ray diffraction spectrum. Here, a diffraction intensity of the peak at a position of 2θ=19.9° was referred to as IA, and a diffraction intensity of the peak at a position of 2θ=17.0±0.5° was referred to as IB, and in this regard, a ratio of IB/IA was less than 0.5°. In the graph of FIG. 2, a peak indicated by a triangle was considered to be originated from a LiBr phase, and a peak indicated by a circle was considered as to be originated from a phase having relatively high ion conductivity.

According to the evaluation results regarding the materials, it was suggested that a particular crystalline phase exists in the sulfide-based solid electrolyte of Example 1.

Example 2

In the same manner as in Example 1, a sulfide-based solid electrolyte powder was prepared to have a composition of $LI_7P_2I_{0.67}Br_{0.33}$. Then, in the same manner as in Example 1, materials for the sulfide-based solid electrolyte powder of Example 2 were evaluated by measurement of ion conductivity, calculation of activation energy, and measurement of powder X-ray diffraction, and the measured powder X-ray diffraction spectrum was shown in FIG. 2.

As a result of the measurement of ion conductivity, the sulfide-based solid electrolyte of Example 2 had ion conductivity of $1.1 \times 10^{-3}$ S/cm at a temperature of 25° C. and activation energy of 33.2 kJ/mol. In addition, as shown in FIG. 2, peaks were clearly observed at a position of 2θ=19.9°, 2θ=23.5°, and 2θ=29.3° in the powder X-ray diffraction spectrum measured on the sulfide-based solid electrolyte of Example 2. When a diffraction intensity of the peak at a position of 2θ=19.9° was referred to as IA, and a diffraction intensity of the peak at a position of 2θ=17.0±0.5° was referred to as IB, a ratio of IB/IA was less than 0.50.

According to the evaluation results regarding the materials, it was suggested that a particular crystalline phase exists in the sulfide-based solid electrolyte of Example 2.

Example 3

In the same manner as in Example 1, a sulfide-based solid electrolyte powder was prepared to have a composition of $LI_7P_2S_8I_{0.5}Br_{0.5}$.

Then, in the same manner as in Example 1, materials for the sulfide-based solid electrolyte powder of Example 3 were evaluated by measurement of ion conductivity, calculation of activation energy, and measurement of powder X-ray diffraction, and the measured powder X-ray diffraction spectrum was shown in FIG. 2.

As a result of the measurement of ion conductivity, the sulfide-based solid electrolyte of Example 3 had ion conductivity of $2.1 \times 10^{-3}$ S/cm at a temperature of 25° C. and activation energy of 33.6 kJ/mol. In addition, as shown in FIG. 2, peaks were clearly observed at a position of 2θ=19.9°, 2θ=23.5°, and 2θ=29.3° in the powder X-ray diffraction spectrum measured on the sulfide-based solid electrolyte of Example 3. When a diffraction intensity of the peak at a position of 2θ=19.9° was referred to as IA, and a diffraction intensity of the peak at a position of 2θ=17.0±0.5° was referred to as IB, a ratio of IB/IA was less than 0.50/1.

According to the evaluation results regarding the materials, it was suggested that a particular crystalline phase exists in the sulfide-based solid electrolyte of Example 3.

Example 4

In the same manner as in Example 1 except for using dimethoxyethane as the second organic solvent in the second process for the preparation of the sulfide-based solid electrolyte powder, a sulfide-based solid electrolyte powder was prepared to have a composition of $LI_7P_2S_8I_{0.5}Br_{0.5}$.

Figure 3:
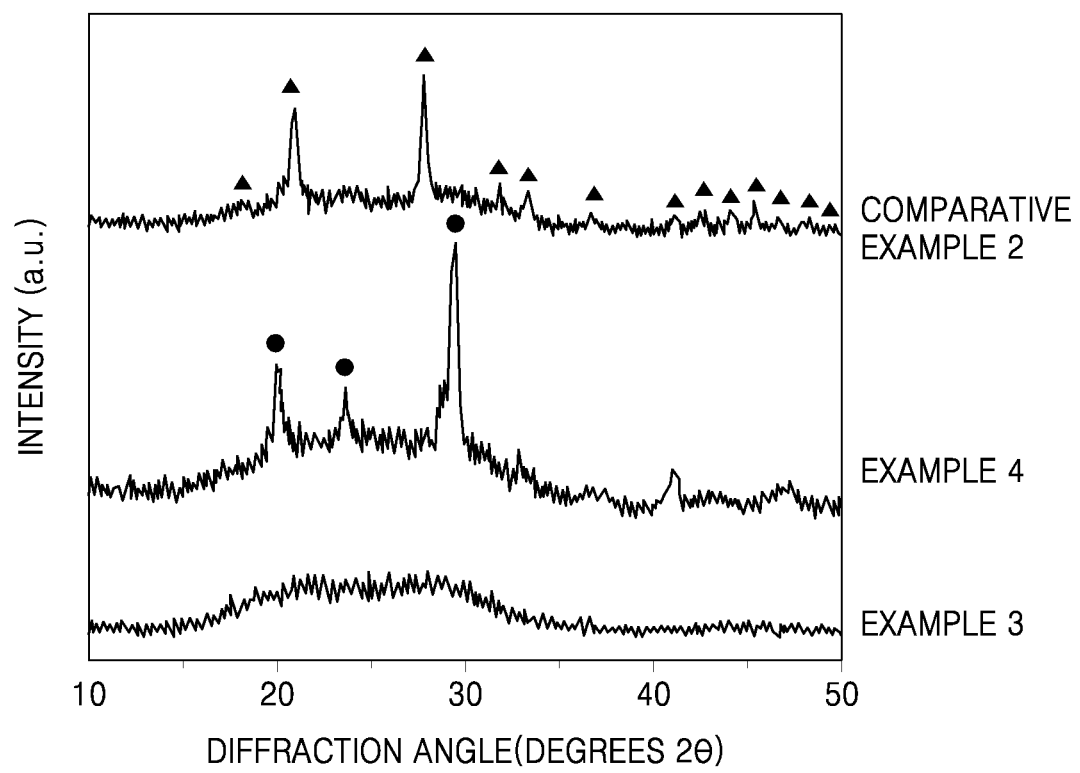
FIG. 3 is a graph of intensity (a.u.) versus diffraction angle (degrees 2θ) showing the results of powder X-ray diffraction analysis of sulfide-based solid electrolytes prepared in Example 4 and Comparative Examples 2 and 3 using Cu—Kα radiation.

In the same manner as in Example 1, materials for the sulfide-based solid electrolyte powder of Example 4 were evaluated by measurement of ion conductivity, calculation of activation energy, and measurement of powder X-ray diffraction, and the measured powder X-ray diffraction spectrum was shown in FIG. 3.

As a result of the measurement of ion conductivity, the sulfide-based solid electrolyte of Example 4 had ion conductivity of $2.6 \times 10^{-4}$ S/cm at a temperature of 25° C. and activation energy of 35.0 kJ/mol. In addition, as shown in FIG. 3, peaks were clearly observed at a position of 2θ=19.9°, 2θ=23.5°, and 2θ=29.3°. When a diffraction intensity of the peak at a position of 2θ=19.9° was referred to as IA, and a diffraction intensity of the peak at a position of 2θ=17.0±0.5° was referred to as IB, a ratio of IB/IA was less than 0.50/1.

According to the evaluation results regarding the materials, it was suggested that a particular crystalline phase exists in the sulfide-based solid electrolyte of Example 4.

Comparative Example 1

In the same manner as in Example 1, a sulfide-based solid electrolyte powder was prepared to have a composition of $LI_7P_2S_8Br$.

Then, in the same manner as in Example 1, materials for the sulfide-based solid electrolyte powder of Comparative Example 1 were evaluated by measurement of ion conductivity, calculation of activation energy, and measurement of powder X-ray diffraction, and the measured powder X-ray diffraction spectrum was shown in FIG. 3.

As a result of the measurement of ion conductivity, the sulfide-based solid electrolyte of Comparative Example 1 had ion conductivity of $3.7 \times 10^{-4}$ S/cm at a temperature of 25° C. and activation energy of 35.7 kJ/mol. In addition, peaks were clearly observed at a position of 2θ=19.9° and 2θ=29.3° in the powder X-ray diffraction spectrum measured on the sulfide-based solid electrolyte of Comparative Example 1. However, no peak at a position of 2θ=23.5° was observed. When a diffraction intensity of the peak at a position of 2θ=19.9° was referred to as IA, and a diffraction intensity of the peak at a position of 2θ=17.0±0.5° was referred to as IB, a ratio of IB/IA was less than 0.50/1.

According to the evaluation results regarding the materials, it was suggested that a particular crystalline phase found in the sulfide-based solid electrolytes of Examples 1 to 4 did not exist in the sulfide-based solid electrolyte of Comparative Example 1.

Comparative Example 2

In the same manner as in Comparative Example 1 except for using N-dimethyl formamide as the second organic solvent in the second process for the preparation of the sulfide-based solid electrolyte powder, a sulfide-based solid electrolyte powder was prepared to have the same composition as Comparative Example 1.

In the same manner as in Comparative Example 1, materials for the sulfide-based solid electrolyte powder of Comparative Example 2 were evaluated by measurement of ion conductivity, calculation of activation energy, and measurement of powder X-ray diffraction, and the measured powder X-ray diffraction spectrum was shown in FIG. 3.

As a result of the measurement of ion conductivity, the sulfide-based solid electrolyte of Comparative Example 2 had ion conductivity of $5.6 \times 10^{-8}$ S/cm at a temperature of 25° C. In addition, as shown in FIG. 3, peaks were not clearly observed at a position of 2θ=19.9° and 2θ=23.5° in the powder X-ray diffraction spectrum measured on the sulfide-based solid electrolyte of Comparative Example 2.

According to the evaluation results regarding the materials, it was suggested that a particular crystalline phase found in the sulfide-based solid electrolytes of Examples 1 to 4 did not exist in the sulfide-based solid electrolyte of Comparative Example 2.

According to an embodiment, a sulfide-based solid electrolyte having low activation energy and excellent ion conductivity may be efficiently prepared.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A method of preparing a sulfide solid electrolyte, the method comprising:
   first contacting a starting material comprising $Li_2S$, $P_2S_5$, and LiI in a first solvent to provide a solvate; and
   second contacting the solvate with a second solvent to prepare the sulfide solid electrolyte,
   wherein the first solvent comprises a $C_1$-$C_3$ alkyl group or a cyclic ether compound which is unsubstituted or substituted with a $C_1$-$C_3$ alkoxy group,
   the second solvent comprises a $C_1$-$C_{10}$ hydrocarbon substituted with a $C_1$ to $C_6$ alkoxy group, and
   the second contacting comprises heating the solvate in the second solvent at a temperature in a range from about 100° C. to about 180° C. for about 30 minutes to about 300 minutes to react the solvate.

2. The method of claim 1, wherein the first solvent comprises an oxetane compound, a tetrahydrofuran compound, or a tetrahydropyran compound.

3. The method of claim 1, wherein the first solvent is tetrahydrofuran.

4. The method of claim 1, wherein the starting material further comprises $GeS_2$, $P_2S_3$, $P_2O_5$, $SiO_2$, $B_2S_3$, $Al_2S_3$, $B_2O_3$, or a combination thereof.

5. The method of claim 1, wherein a concentration of the starting material in the first solvent is in a range of about 1 weight percent to about 10 weight percent, based on a total weight of the first solvent and the starting material.

6. The method of claim 1, wherein a temperature of contacting the starting material in the first solvent to provide the solvate is in a range from about 30° C. to about 80° C.

7. The method of claim 1, wherein second solvent comprises a $C_1$-$C_{10}$ hydrocarbon.

8. The method of claim 1, wherein the second solvent comprises
   dimethyl ether, methyl ethyl ether, diethyl ether, methyl n-propyl ether, ethyl n-propyl ether, di-n-propyl ether, methyl iso-propyl ether, ethyl iso-propyl ether, di-iso-propyl ether, n-propyl iso-propyl ether, methyl n-butyl ether, ethyl n-butyl ether, n-propyl n-butyl ether, iso-propyl n-butyl ether, methyl sec-butyl ether, ethyl sec-butyl ether, n-propyl sec-butyl ether, iso-propyl sec-butyl ether, methyl iso-butyl ether, ethyl iso-butyl ether, n-propyl iso-butyl ether, iso-propyl iso-butyl ether, methyl tert-butyl ether, ethyl tert-butyl ether, n-propyl tert-butyl ether, iso-propyl tert-butyl ether, di-n-butyl ether, di-sec-butyl ether, di-iso-butyl ether, sec-butyl n-butyl ether, iso-butyl n-butyl ether, tert-butyl n-butyl ether, iso-butyl sec-butyl ether, tert-butyl sec-butyl ether, tert-butyl iso-butyl ether, or a combination thereof;
   dimethoxy ethane, diethoxy ethane, methoxy ethoxy ethane, 1,3-dimethoxy propane, 1,3-diethoxy propane, 1-methoxy 3-ethoxy propane, 1,2-dimethoxy propane, 1,2-diethoxy propane, 1-methoxy 2-ethoxy propane, 1-ethoxy 2-methoxy propane, or a combination thereof;
   cyclopropyl methyl ether, cyclopropyl ethyl ether, cyclobutyl methyl ether, cyclobutyl ethyl ether, cyclobutyl n-propyl ether, cyclobutyl iso-propyl ether, cyclopentyl methyl ether, cyclopentyl ethyl ether, cyclopentyl n-propyl ether, cyclopentyl iso-propyl ether, cyclopentyl n-butyl ether, cyclopentyl iso-butyl ether, cyclopentyl sec-butyl ether, cyclopentyl tert-butyl ether, cyclohexyl methyl ether, cyclohexyl ethyl ether, cyclohexyl n-propyl ether, cyclohexyl iso-propyl ether, cyclohexyl n-butyl ether, cyclohexyl iso-butyl ether, cyclohexyl sec-butyl ether, or cyclohexyl tert-butyl ether; or
   a combination thereof.

9. The method of claim 1, wherein the second solvent comprises dimethoxyethane, diethoxyethane, diethyl ether, di-iso-propyl ether, cyclopentylmethyl ether, or a combination thereof.

10. The method of claim 1, wherein the heating of the solvate is performed at a pressure which is less than atmospheric pressure.

11. The method of claim 1, wherein the first contacting and the second contacting are each performed in an inert gas atmosphere.

12. The method of claim 1, further comprising cleaning or drying the sulfide solid electrolyte obtained after the second process.

13. The method of claim 1,
wherein the starting material further comprises LiBr, and
wherein the sulfide solid electrolyte is represented by Formula (1):

$$(1-x)\text{LiI} \cdot x\text{LiBr} \cdot 2\text{Li}_3\text{PS}_4 \qquad (1)$$

wherein, in Formula 1, x is from greater than 0 to 1.

14. The method of claim 1, wherein the sulfide solid electrolyte exhibits peaks at angles of 19.9±0.5°, 23.5±0.5°, and 29.3±0.5° two-theta when analyzed by an X-ray diffraction using a Cu—Kα radiation, and
wherein a ratio of an intensity of the peak at 19.9±0.5° two-theta to an intensity of a peak at 17.0±0.5° two-theta is less than 0.50.

15. The method of claim 1, wherein the sulfide solid electrolyte has an ionic conductivity in a range from about $1\times10^{-5}$ Siemens per centimeter to about $1\times10^{-2}$ Siemens per centimeter at a temperature of 25° C.

16. The method of claim 1, wherein the sulfide solid electrolyte has an activation energy in a range from about 30 kilojoules per mole to about 40 kilojoules per mole.

17. The method of claim 1, wherein the second contacting comprises heating the solvate in the second solvent at the temperature in the range from about 100° C. to about 180° C. for about 30 minutes to about 300 minutes to react the solvate with a halogen substance.

18. A sulfide solid electrolyte prepared by the method of claim 1.

19. A solid secondary battery comprising:
a positive electrode comprising a positive active material,
a negative electrode comprising a negative active material, and
a solid electrolyte layer disposed between the positive electrode and the negative electrode, wherein the solid electrolyte layer comprises a sulfide solid electrolyte prepared according to claim 1.

* * * * *